UNITED STATES PATENT OFFICE.

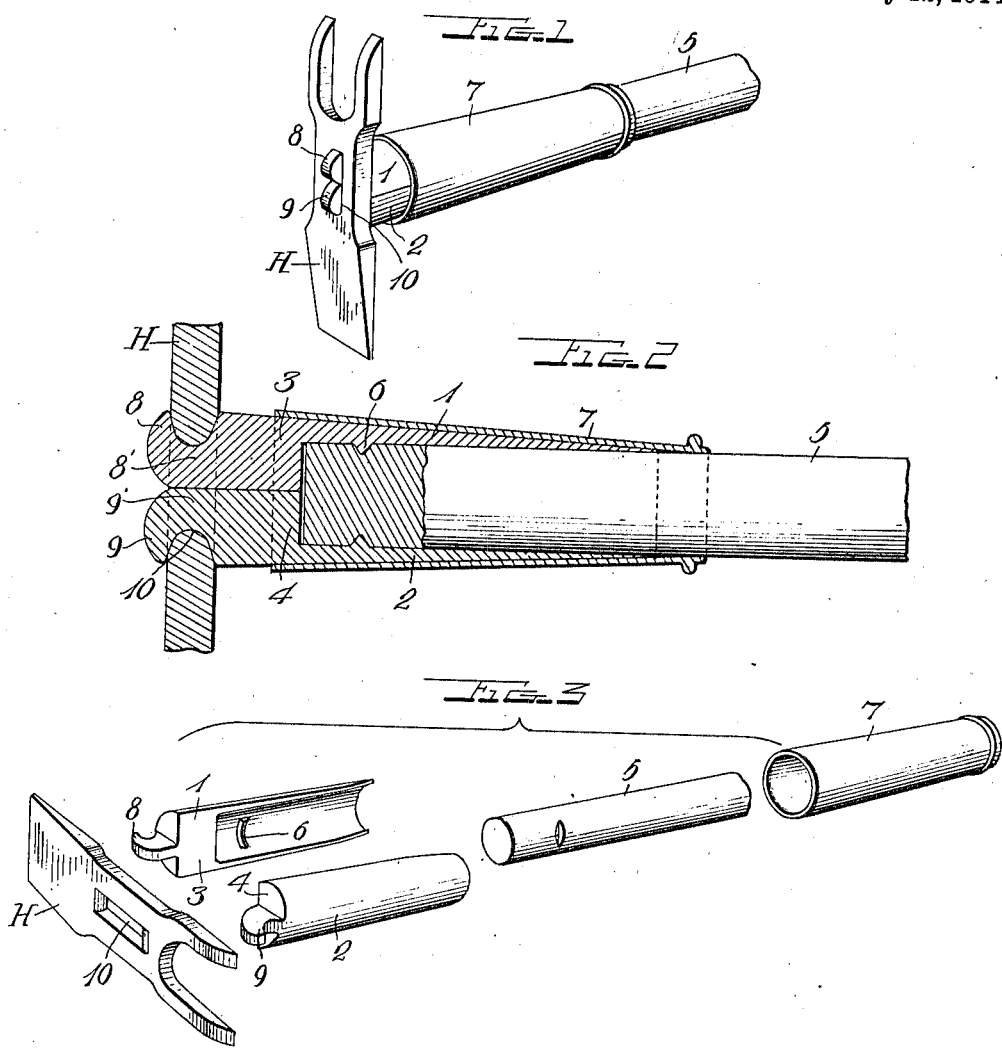

JOHN H. URSCHEL, OF WESTPLAINS, MISSOURI.

TOOL-COUPLING.

1,096,650.  Specification of Letters Patent.  Patented May 12, 1914.

Application filed January 9, 1913. Serial No. 741,090.

*To all whom it may concern:*

Be it known that I, JOHN H. URSCHEL, a citizen of the United States, residing at Westplains, in the county of Howell and State of Missouri, have invented certain new and useful Improvements in Tool-Couplings; and I do declare the following to be a full, clear, and exact description of the invention, such as will enable others skilled in the art to which it appertains to make and use the same.

This invention relates to improvements in couplings for connecting the handle of a tool or implement with the head thereof.

The object of the invention is to provide a coupling for detachably connecting a tool to its handle, whereby the handle may be quickly connected or disconnected without the use of tools and when connected is held securely against breakage, the respective members forming coöperating supports and reinforces for each other.

Another object is to provide a simple and durable device of this character by the use of which the expense of manufacturing and the labor of repairing are reduced to a minimum.

Another object is to provide a tool handle coupling whereby the handle is greatly strengthened and the parts held in proper relation against bending or splitting.

With these and other objects in view, the invention consists of certain novel features of construction, and the combination and arrangements of parts as will be more fully described and claimed.

In the accompanying drawings; Figure 1 represents a perspective view of a hoe equipped with this improved coupling; Fig. 2 is a longitudinal central section thereof; Fig. 3 is a perspective view of the parts arranged in juxtaposition ready for assembling.

This coupling as shown in Figs. 1 to 3 comprises a split socket, the sections 1 and 2 of which are provided at one end with strain resisting pressure blocks 3 and 4 which are preferably integral and extend inward about one-fourth more or less of the length of the sections and have flat faces extending flush with the side edges of the sections forming when the sections are assembled a solid shank. The inner ends of these blocks 3 and 4 form an abutment for the end of a handle 5 and limit the movement of the handle and socket relatively to each other and they also form a closure for the socket at one end.

The inner faces of the socket sections 1 and 2 beyond the blocks 3 and 4 are provided with handle engaging means here shown in the form of projections or ribs 6 designed to enter notches in the handle, whereby the handle is held against outward movement when the sections are bound together which is here accomplished by means of a ferrule 7. These socket sections 1 and 2 preferably taper toward their open ends and the walls thereof are reduced in thickness toward said open ends where they terminate in a knife edge to adapt them to fit closely against the handle 5 and form a continuation thereof without an obstructing shoulder and also exerts a wedge like binding action when the ferrule 7 is applied. The side edges of the sections 1 and 2 are preferably inclined inwardly toward their free ends to space said ends apart and adapt them to closely grip the handle.

Tool eye engaging hooks 8 and 9 project from the ends of the sections carrying the blocks 3 and 4 and are preferably formed integral therewith. These hooks curve outwardly in opposite directions and have their adjacent faces contacting when the sections are in operative position, said adjacent faces being straight for a portion of their length and merging into rounded heads at their free ends for facilitating the insertion and removal of said hooks into and from the eye of the tool to which the handle is to be connected and which is here shown in the form of a hoe H. The hoe here shown has an eye in the form of a rectangular slot 10 beveled at its opposite ends on both faces of the hoe to facilitate the connection of the coupling therewith. The length of this slot 10 corresponds to the combined width of the shanks 8' and 9' of the two hooks 8 and 9 and the width of said slot to the thickness of said hook shanks. The distance between the under faces of the beaks of the hooks and their bases corresponds to the thickness of the hoe or other implement to which it is to be applied, whereby said hoe is readily held between the outturned free ends or beaks of said hooks and the ends of the socket sections.

In the use of this coupling when constructed as above described, the section 1 has the hook 8 thereof inserted in the eye 10 of the hoe and the other hook is then also inserted with the shell like ends of said sections spread apart sufficiently to receive the handle 5 which corresponds in diameter to the inner diameter of the combined sections and when placed between them the notches therein are engaged by the ribs 6 of said sections when the sections are forced together and firmly clamp the handle between them. When the parts are in this position the ferrule 7 is applied being slipped over the outer end of the handle and moved forwardly over the outer ends of the sections 1 and 2. This ferrule 7 is forced down onto said sections preferably by a blow exerted on the hoe when the parts will be firmly locked into operative position ready for use.

It will be obvious that this coupling when constructed and assembled as above described will form a solid shank adjacent the hoe or other tool to which it is connected and the handle fitting in the shell like portion of the socket sections forms a continuation of this solid shank thereby avoiding any danger of the handle being split such as is likely to occur when the shank of an ordinary tool is driven into the handle thereof.

I claim as my invention:

The combination with a tool head having an opening therein, two of the opposed walls of said opening being rounded, of a tool handle coupling comprising two shell like socket sections each having a solid portion at one end with a hook on the outer end of said solid portion the hooks on said sections being outturned and having their shanks curved on their outer faces to fit the rounded walls of the opening in the tool head, the combined width of said shanks corresponding to the length of the opening in the tool head and completely filling said opening when applied, the meeting faces of said hook shanks lying flat against each other and the inner ends of the hooks being curved to facilitate their insertion in the tool head opening.

In testimony whereof I have hereunto set my hand in presence of two subscribing witnesses.

JOHN H. URSCHEL.

Witnesses:
J. L. BESS,
WM. S. MORGAN.